(12) United States Patent
Haertel

(10) Patent No.: US 7,885,890 B2
(45) Date of Patent: Feb. 8, 2011

(54) SYSTEM FOR AUTHORIZING CREDIT USE

(75) Inventor: Scott Haertel, Hanover Park, IL (US)

(73) Assignee: HSBC Finance Corporation, Mettawa, IL (US)

( * ) Notice: Subject to any disclaimer, the term of this patent is extended or adjusted under 35 U.S.C. 154(b) by 160 days.

(21) Appl. No.: 11/624,044

(22) Filed: Jan. 17, 2007

(65) Prior Publication Data

US 2007/0164102 A1     Jul. 19, 2007

Related U.S. Application Data

(60) Provisional application No. 60/759,988, filed on Jan. 17, 2006.

(51) Int. Cl.
    *G06Q 40/00*      (2006.01)
    *G06K 5/00*      (2006.01)
    *G06K 15/00*      (2006.01)
(52) U.S. Cl. .................. 705/38; 235/380; 235/383; 705/17; 705/44
(58) Field of Classification Search ............ 705/35, 705/38–45; 235/380
See application file for complete search history.

(56) References Cited

U.S. PATENT DOCUMENTS

| 3,594,727 | A | 7/1971 | Braun |
| 3,697,693 | A | 10/1972 | Deschenes et al. |
| 3,719,927 | A | 3/1973 | Michels et al. |
| 4,317,957 | A | 3/1982 | Sendrow |
| 4,485,300 | A | 11/1984 | Peirce |
| 4,567,359 | A | 1/1986 | Lockwood |
| 4,648,037 | A | 3/1987 | Valentino |

(Continued)

FOREIGN PATENT DOCUMENTS

CA      2304293     * 10/2000

(Continued)

OTHER PUBLICATIONS

Daly, James. Kiosks in a Freeze Frame. Credit Card Management. Apr. 1993. vol. 6, Issue 1. pp. 42-45.*

(Continued)

*Primary Examiner*—Kambiz Abdi
*Assistant Examiner*—Stephanie Ziegle
(74) *Attorney, Agent, or Firm*—Michael Best & Friedrich LLP

(57) ABSTRACT

A credit approval and authorization system includes a credit request device, such as a terminal, located in a sales location, such as a store. The credit request device is operable to receive customer-related information, including a credit request, and to communicate the customer-related information to a credit analysis module. If the credit request is approved by the credit analysis module, the credit analysis module generates a conditional offer and the credit request device directs the customer to a point of sale system, such as a cash register, within the sales location, for manual verification of the customer's identity by an employee of the merchant. If the conditional offer is accepted and the identity of the customer is verified at the point of sale system, an activation module operates to establish a credit account. The system also includes an authorization module operable to determine whether to authorize use of the credit account to make a purchase.

15 Claims, 6 Drawing Sheets

U.S. PATENT DOCUMENTS

| | | | |
|---|---|---|---|
| 4,649,832 A | 3/1987 | Hain et al. | |
| 4,672,377 A | 6/1987 | Murphy et al. | |
| 4,722,054 A * | 1/1988 | Yorozu et al. | 705/17 |
| 4,734,858 A | 3/1988 | Schlafly | |
| 4,752,877 A | 6/1988 | Roberts et al. | |
| 4,774,664 A | 9/1988 | Campbell et al. | |
| 4,799,156 A | 1/1989 | Shavit et al. | |
| 4,812,628 A | 3/1989 | Boston et al. | |
| 4,858,121 A | 8/1989 | Barber et al. | |
| 4,914,587 A | 4/1990 | Clouse | |
| 4,941,090 A | 7/1990 | McCarthy | |
| 4,947,028 A | 8/1990 | Gorog | |
| 4,961,109 A | 10/1990 | Tanaka | |
| 4,994,964 A | 2/1991 | Wolfberg et al. | |
| 4,999,763 A | 3/1991 | Ousborne | |
| 5,025,138 A | 6/1991 | Cuervo | |
| 5,120,906 A | 6/1992 | Protheroe et al. | |
| 5,126,936 A | 6/1992 | Champion et al. | |
| 5,206,803 A | 4/1993 | Vitagliano et al. | |
| 5,239,462 A | 8/1993 | Jones et al. | |
| 5,259,066 A | 11/1993 | Schmidt | |
| 5,262,941 A | 11/1993 | Saladin et al. | |
| 5,285,382 A | 2/1994 | Muehlberger et al. | |
| 5,305,434 A | 4/1994 | Ballard et al. | |
| 5,323,315 A | 6/1994 | Highbloom | |
| 5,345,595 A | 9/1994 | Johnson et al. | |
| 5,383,113 A | 1/1995 | Kight et al. | |
| 5,393,963 A | 2/1995 | Thomas et al. | |
| 5,398,300 A | 3/1995 | Levey | |
| 5,475,585 A | 12/1995 | Bush | |
| 5,481,647 A | 1/1996 | Brody et al. | |
| 5,535,407 A | 7/1996 | Yanagawa et al. | |
| 5,537,315 A | 7/1996 | Mitcham | |
| 5,539,450 A | 7/1996 | Handelman | |
| 5,559,895 A | 9/1996 | Lee et al. | |
| 5,569,897 A * | 10/1996 | Masuda | 235/379 |
| 5,576,951 A | 11/1996 | Lockwood | |
| 5,583,760 A | 12/1996 | Klesse | |
| 5,615,408 A | 3/1997 | Johnson et al. | |
| 5,774,882 A | 6/1998 | Keen et al. | |
| 5,797,133 A | 8/1998 | Jones et al. | |
| 5,870,721 A | 2/1999 | Norris | |
| 5,930,776 A | 7/1999 | Dykstra et al. | |
| 5,940,811 A | 8/1999 | Norris | |
| 6,105,007 A | 8/2000 | Norris | |
| 6,144,948 A * | 11/2000 | Walker et al. | 705/38 |
| 6,289,319 B1 | 9/2001 | Lockwood | |
| 6,456,984 B1 | 9/2002 | Demoff et al. | |
| 6,594,481 B1 | 7/2003 | Johnson et al. | |
| 6,877,656 B1 * | 4/2005 | Jaros et al. | 235/380 |
| 7,010,508 B1 | 3/2006 | Lockwood | |
| 2002/0104881 A1 | 8/2002 | Schilling | |
| 2003/0078877 A1 * | 4/2003 | Beirne et al. | 705/38 |
| 2004/0138997 A1 * | 7/2004 | DeFrancesco et al. | 705/38 |
| 2004/0267673 A1 * | 12/2004 | Ballard et al. | 705/77 |
| 2005/0080693 A1 * | 4/2005 | Foss et al. | 705/30 |
| 2006/0229974 A1 * | 10/2006 | Keithley et al. | 705/38 |

FOREIGN PATENT DOCUMENTS

| | | |
|---|---|---|
| DE | 3400 123 A1 | 7/1985 |
| WO | WO 03/098563 A2 * | 11/2003 |

OTHER PUBLICATIONS

Kranhold, Kathryn. GE Puts Self-Service Credit Kiosks at Ikea. Wall Street Journal. Dec. 1, 2005.*

HSBC Retail Services. Credit Kiosks Enhance Customer and Merchant Satisfaction. Oct. 29, 2005. http://web.archive.org/web/20051029045127/http://www.hsbcusa.com/retailservices/pdf/kiosk_en_us.pdf.*

Wirespring Website on Instant Credit Kiosks. Dec. 30, 2005. http://web.archive.org/web/20051030092301/http://www.wirespring.com/Solutions/instant_issuance_credit_finance_kiosks.html.*

Rudnick, Michael. In-Store Credit Kiosk Boosts Wolf Furniture's Application. May 2, 2005. HFN The Weekly Newspaper for the Home Furnishing Network.*

Carroll, Brial. Self Service Credit Checking Kiosks Hit Furniture Store Floors. Feb. 16, 2004. Furniture Today. 28,28.p. 38.*

McIntosh, Jay. Stores Combine Discounts with Financing. Aug. 29, 2005. Furniture Today.*

Wolf Tests Credit Kiosks. Jun. 20, 2005. Furniture Today. 29,40 p. 4.*

HSBC 2004 Annual Report. Apr. 2005. http://www.hsbc.com/1/PA_1_1_S5/content/assets/investor_relations/hsbc2004ar2.pdf.*

Allen, J., "Group Sees No Bargain in Fast Mortgage OKs" *Chicago Tribune* (North Sports Final, C Edition), Business, p. 1 (Oct. 30, 1990).

Anderson, K., "Automation: CLO Update: Bringing Consumer, Realtor and Lender a Step Closer?" *Mortgage Banking* 48(1):154 (Oct. 1987). Abstract only.

Arend, M., "Are Your Bank's ATMs Earning Their Keep?" *ABA Banking Journal* 83(11) (Nov. 1991).

Arend, M. "Executives Tap Bank Performance Systems" *ABA Banking Journal* 85(4):58 (Apr. 1993).

Atkinson, B., "Perpetual Rings Up More Loans by Turning to Call-in Lending" *Washington Business Journal*, 7(18):10 (Sep. 26, 1988).

"Banking of the Future" *The Orange County Register*, Business, p. c01 (Jan. 29, 1987).

Barthel, M., "Appro Software Can Issue Credit Cards in Seconds" *American Banker* 156(147) (Aug. 1, 1991).

"BayBanks Automates Loans" *American Banker* 154(214):10 (Nov. 1, 1989).

Bost, P. "A Roadmap for the Future: Creating New Value for the Self-Service Channel" Published by Diebold, Incorporated (Jan. 2006).

Bray, N., "Electronic Banking in Europe: Technology" *The Wall Street Journal* (Europe), p. 4 (Feb. 4, 1993).

Bredin, A., "Mervyn's Tests Kiosks" *Stores* 75(3):36 (Mar. 1993).

Brennan, P., "Promise of Artificial Intelligence Remains Elusive in Banking Today" *Banking Management* 69(7):49 (Jul. 1993). Abstract only.

"Briefs: (Sears Frequent—Shopper Program)" *Card News* 5(18):6 (Sep. 24, 1990). Abstract only.

Broderick, M., "VERBATIM: High-Tech Lending in the Realty Agent's Office" *American Banker*, p. 11 (Oct. 18, 1993).

Buckner, D., "Books: Handbook of Mortgage Processing, Mortgage Banking" *Mortgage Banking* 52(8):85 (May 1993).

Cademartori, K., "Special Delivery: Automation of Mortgage Banking" *Mortgage Banking*, 52(6):10 (Mar. 1992).

"Card Processing System is Revamped" *ABA Banking Journal*, New Products & Services p. 72 (Dec. 1992).

Carpenter, M. "Software: Decision-Support Software Speeds Credit Analysis" *Commercial Lending Review* 7(1):97 (Winter 1991-1992).

"CEO Roundtable: Phone a Loan, Too" *Credit Union Magazine* 59(3):11 (Mar. 1993). Abstract only.

Chorafas, D, "Strategic Planning for Electronic Banking" Butterworth Legal Publishers, United States, Butterworth & Co. (Publishers) Ltd., United Kingdom (1987).

Chorafas, D. et al., "Mining the Technological Benefits" *Retail Banker International*, p. 14 (May 13, 1994).

Cisney, K. "The Marriage of Mortgage Lending & Technology; Mortgage Banks' Use of Information Technologies" *Mortgage Banking* 53(7):65 (Apr. 1993).

"Citibank to Offer 15-Minute Mortgages in New York Area" *PR Newswire* (Nov. 22, 1989).

"Closer Look: 24x7 Remote Lending Services Delivery: Where Should your Efforts be Focused: Internet, Call Centers or Automated Telelending?" Vysym Corporation (2002).

"Closer Look: Lender Boosts *TALIS*™ Loan by Phone Applications 84%" Vysym Corporation (2002).

Colby, M., "Focus on Strength and Relationship Building: Marketing Developments in Delaware Valley Banks" *Bank Marketing* 24(1):18 (Jan. 1992).

"Consumer Banking: Mortgages—How Can Technology Help Reduce Paper in Mortgage Originations" *American Banker*, Management Strategies, p. 10A (Jan. 3, 1993).

Cook, J. et al. "Branch Automation Project Was Ahead of Its Time" *ABA Banking Journal*, Computers & Operations, p. 66 (Feb. 1992).

Copyright Registration No. TX 3-070-946 "HAPS Remote Program" Mar. 14, 1991.

Copyright Registration No. TXu 462-341 "HAPS" Mar. 14, 1991.

Copyright Registration No. TXu 475-906 "HRSI Application Processing System Operator's Input Guide" Mar. 14, 1991.

Copyright Registration No. TXu 493-513 "HAPS on DEC" Oct. 25, 1991.

Cournyer, A., "Texas Commerce Bancshares Re-Engineers Consumer Lending with Document Image Management and Workflow Processing" *Remittance and Document Processing Today*, 15(2):13 (Nov.-Dec. 1992). Abstract only.

Courter, E., "Dialing for Dollars" *Credit Union Management* 16(7):45 (Jul. 1993).

Courter, E., "Loans That Beat the Clock" *Credit Union Management* 16(7):42 (Jul. 1993).

Courter, E., "Operations: Midnight Loan Express" *Credit Union Management* 14(1):29 (Jan. 1991). Abstract only.

Crockett, B., "The Back Office: Systems—Synovus at Crossroads After Decade of Growth" *American Banker*, Management Strategies, p. 1A (Feb. 16, 1993).

Dalton, G., "FIserv, Inc. and Mellon Bank Corp. Announce Agreement for Sale of Two Mellon Outsourcing Businesses for Bank Processing and Related Services" *Business Wire*, Sec. 1, p. 1 (Aug. 2, 1993).

Daly, J., "Kiosks in a Freeze Frame" *Credit Card Management* 6(1):42 (Apr. 1993).

"Department Store Reconfigures Credit Decision Process" *Credit Risk Management Report* 2(20) (Sep. 28, 1992).

Dreasang, J., "On-Line Lending" *USA Today*, Personal Finance Bonus Section, p. 01.E (Oct. 17, 1988).

"Enhanced Credit Bureau Check" *ABA Banking Journal*, New Products & Services, p. 152 (Oct. 1988).

Fielder, K., "Automated Underwriter: 365 Days a Year" *Mortgage Banking* 47(7):64 (Apr. 1987). Abstract only.

"Financial Services Firm Upgrades Its Network Using Five-Step Plan: On-Line Financial Services, Inc." *Networking Management* 8(1): 69 (Jan. 1990).

"FIS Announces Acquisition of Louisiana Companies, Computer Division Inc. At MBA Conference" *Business Wire* (Mar. 30, 1993).

Flagg, M., "Hill Fight Looms on Loan Marketing; Computerized Mortgage Systems Spur Financial Services Turf War" *The Washington Post* (Final Edition), Real Estate, p. 1 (Feb. 24, 1990).

Fleck, R., "The Shape of Things to Come; Special Section: Perspectives on the Future" *FedsInformation Executive* 4(1):37 (Jan. 1991).

Florian, E. et al., "The Money Machines: The Humble ATM Revolutionized The Way We Deal with Money and Turned Global Commerce Into a 24/7 Affair. You Can Thank a Texan Named Don Wetzal—and the Blizzard of 1978" http://money.cnn.com/magazines/fortune/fortune_archive/2004/07/26/377172/index.htm (Jul. 26, 2004).

Fraser, B., "Corporate Banking: Lending: Michigan National Takes Lead in Electronic Overhaul" *American Banker*, Management Strategies, p. 12A (Feb. 1, 1993).

Freestyle-Ven/Telecash: Freestyle Ventures Inc. Announces Consummation of Merger with Telecash Advance of Utah Inc. *Business Wire* (Nov. 10, 1988).

Granelli, J., "Bank's Automation Speeds Loans Security Pacific's System Used at its 38 Business Centers" *The Los Angeles Times* (Orange County Edition) Business, 4, Financial Desk, p. 6 (Jul. 20, 1986).

Grant, N. "A New Era for ATMs" *U.S. Banker* (National Edition), Special Report, p. 57 (Jun. 1995).

Guenther, R., "Citicorp Offers Mortgage Commitments in 15 Minutes" *The Wall Street Journal* (Eastern Edition), p. 1 (Feb. 8, 1989).

Hammond, C., "Raytheon Employee's Federal Credit Union Interactive Voice Response Application Implementation" *Speech Technology* 5(3):40 (Feb.-Mar. 1991). Abstract only.

Hampton, R., "Automating Commercial Loans" *Computer Decisions* 8(3):34 (Mar. 1976). Abstract only.

Harney, K., "Lawsuit Clouds Computerized Home-Loan Network" *Star Tribune* (Metro Edition), Nation's Housing, p. 05.R (Jul. 23, 1988). Abstract only.

Harrington, J., "Credit Scoring: Approve? Disapprove?" *Credit Union Management* 15(9):20 (Sep. 1992).

"Household international Annual Report 1990: Managing Consumer Credit Risk" Household International, pp. 6-10 (1990).

"IBM Users Get 'Credicheck'" *Computerworld*, Software & Services, p. 69 (May 10, 1982).

"Innovative Credit Processing and Management System Debuts Automated Credit Processing and Perpetuall" *PR Newswire* (Sep. 19, 1988).

"IT in the Mortgage Business: Electronic Trading Cuts Costs" *Banking World* 10(10):27 (Oct. 1992). Abstract only.

Johnson, G., "Decision-Making Business Software May Be What Doctor Ordered" *Los Angeles Times* (Orange County Edition), Business, part 4, p. 8, col. 1, Financial Desk (Jul. 12, 1987).

Kane, T. et al., "Credit Union Executive's Survey of Credit Union Lending Automation" *Credit Union Executive* 30(3):16 (Fall 1990). Abstract only.

Kantrow, Y., "Telex-Computer Link Connects MasterCard to Remote Areas" *American Banker* 152(83):11 (Apr. 29, 1987).

Kersnar, S, "Which ASP Model Will Work?" *Collections World*, http://www.collectionsworld.com/news/041901_8.htm (Apr. 19, 2001).

Kingbanking, J., "Bankers Brace for Mortgage Data" *The Atlanta Journal and Constitution*, Business, Section F, p. 2 (Sep. 18, 1992).

Kolman, J., "Ten Technologies Ahead of the Curve" *Institutional Investor*, Technology: Information Management, p. 123 (Dec. 1990).

Kronemyer, B., "ATM Connection: Bank Machines are Getting More Talented" *Indiana Business Magazine* 40(4):21 (Apr. 1996).

Kutler, J., "Loan-by-Phone Software Hits the Market" *American Banker* 153(220):8 (Nov. 9, 1988).

Lagesse, D., "A Plan to Aid Computerized Loan Networks" *American Banker*, p. 1 (Dec. 10, 1984). Abstract only.

Landis, K., "Technology Conquers the Mortgage Mill" *Bankers Monthly* 107(7):33 (Jul. 1990).

Lawrence, J., "(Part 1 of 3) Untangling Neural Nets (When is one model better than another?)" *Dr. Dobbs Journal* (Apr. 1990).

Layne, R., "Commercial Credit Tests Loan System: Finance Firm Looks to Make Most of Deal With Barclays" *American Banker* 154(251):6 (Dec. 27, 1989).

Layne, R., "Mellon Leaps into Imaging Market System to Automate Commercial Lending Functions Series: 11" *American Banker*, Technology News, p. 3 (May 23, 1990).

Layne, R., "PNC in Pact to Automate Business Loans" *American Banker*, Technology News, p. 3 (Oct. 5, 1990).

Lebowitz, J., "Marketing Mortgages on Mars" *Mortgage Banking* 53(2):51 (Nov. 1992).

"Let Your Computer Do the Taking to the IRS this Year" *Seattle Times* (Final Edition), Business, p. 6 (Jan. 28, 1990).

"Loans by Phone" *Credit Union Management* 12(4):12 (Apr. 1989). Abstract only.

"Loans in an Hour for Busy Shoppers" *American Banker* 152(243):6 (Dec. 14, 1989).

"Loans: Loan Application Software" *Credit Union Magazine* 57(8):30 (Aug. 1991). Abstract only.

Lusk, S., "Interpretation of Fees May Decide Future of Prudential's Computerized Loan System" *Orange County Business Journal* 12(16):3 (Aug. 14, 1989).

Lynch, D. et al., "Creating a Modern Credit Approval Environment" *The Credit World* 77(1):24 (Sep./Oct. 1988).

"Magnum Offering Creditors Better Decisions" *Credit Risk Management Report* 6(3) (Feb. 12, 1996).

Mason, T., "How Electronic Genies Are Moving Mortgages Faster" *Business Week* 3051:138D (May 9, 1988). Abstract only.

Matz, L., "Automating Loan Operations Procedures (Part 1)" *Bank Administration* 63(8):16 (Aug. 1987). Abstract only.

McGarvey, J. et al., "Act Now to Improve Commercial Lending Operations" *Commercial Lending Review* 8(4):29 (Fall 1993).

Memmelaar, E., "Mortgage Lenders Speed Decisions Hope Convenience Will Lure Seasonal Homebuyers Series: 11" *American Banker*, Consumer News, p. 6 (May 17, 1990).

Meyers, G., "Loan by Phone is on the Line" *Chicago Sun Times* (Five Star Sports Final Edition), Homelife, p. 29 (Oct. 12, 1990).

Mikel, P. et al., "Here and Now High-Tech" *Mortgage Banking* 52(9):26 (Jun. 1992).

Mishkoff, H., "Billing Systems: They Aren't Just for Billing Anymore" *Cellular Business* 9(12):24 (Nov. 1992).

Morrall, K., "Store Cards: Where the Card is King" *Credit Card Management* 5(12):12 (Sep. 1992).

"Mortgage Ware™ Resource Guide, Release 5.4d" Interlinq Software Corporation (Nov. 1992).

"News Release: Boeing Employees Credit Union Selects TALIS™ Voice Lending" Vysym Corporation (Jun. 12, 2002).

"News Release: FORUM Solutions and Vysym Team to Provide 24/7 Web and Phone Services" Vysym Corporation (.Sep. 6, 2002).

"News Release: NorthEast Alliance Federal Credit Union to Deploy TALIS Voice Gateway" Vysym Corporation (Dec. 10, 2002).

"News Release: Vysym Announces Low Cost 24x7 Lending Program" Vysym Corporation (Sep. 3, 2002).

"News Release: Vysym Announces new TALIS™ Voice Lending Products" Vysym Corporation (May 31, 2002).

"News Release: Vysym Introduces TALIS™ Voice Gateway" Vysym Corporation (Sep. 26, 2002).

"News Release: Vysym Modifies XML Interface to Support Users Connect I.T./OFX" Vysym Corporation (Jan. 27, 2003).

"Notable Quotables", Vysym Corporation (date unknown).

O'Keefe, M. "Credit Checks: Wireless on New Platform" *Bank Systems & Technology* 31(11):22-24 (Nov. 1994).

O'Reilly, B. et al. "EDS After Perot: How Tough Is It?" *Fortune* (Domestic Edition), Corporate Performance, p. 72 (Oct. 24, 1988).

"Over-the-Phone Loans" *American Banker* 154(61):8 (Mar. 29, 1989).

Palmieri, M., "Lending Systems: Know the Score" *Bankers Monthly* 108(2):30 (Feb. 1991).

Pepper, J., "Shopping Spree (retail automation technology)" *CIO* 1(2):14 (Nov.-Dec. 1987). Abstract only.

"Press Room: Press Releases: Agilysys Presents "Store of the Now" at National Retail Federations's (NRF) 94th Annual Convention" Agilysys, Inc., http://www.agilysys.com/Agilysys/PressRoom/PressReleases/2005-01-17.htm (Jan. 17, 2005).

"Press Room: Press Releases: Agilysys, Inc. Partners with St. Claire Interactive, IBM and Symbol Technologies to Create a World-Class, Interactive Grocery Shopping Experience for Giant Food Stores" Agilysys, Inc., http://www.agilysys.com/Agilysys/PressRoom/PressReleases/2005-10-11.htm (Oct. 11, 2005).

Reilly, J., "Mortgage Bankers to Use Computer Network to Expedite Loan Approval" *Star Tribune* (Metro Edition), Shelter, p. 05.R (Mar. 5, 1988). Abstract only.

Rice, J., "New Device Gives Credit Guidance to Sales" *Credit and Financial Management* 74(5):22 (May 1972). Abstract only.

Roberson, R. et al., "Software" *Mortgage Banking* 52(5):81 (Feb. 1992).

Roosevelt, P., "Citicorp to Offer 'Instant' Mortgages Series: 1" *American Banker* 154(14):1 (Jan. 19, 1989).

Saft, J., "Network Financial Introduces Computer Originations System Series: 12" *American Banker*, p. 9 (Oct. 6, 1993).

Salvaggio, D., "Get On-Line" *Orlando Sentinel* (3 Star Edition), Homes, Home Front, p. 21 (May 12, 1990).

Sarvey, D., "State Banks Do 'Very Well' in 'Moderate' Economy" *Central Penn Business Journal* 9(21):6 (Oct. 20, 1993).

Schmidt, K., "Multifunction Terminals for Present and Future Communications Networks" *Revue F.I.T.C.E.* 25(4):41 (Oct.-Dec. 1986). Abstract only.

Schwadel, F., "Sears Introduces Rapid-Credit Program to Woo Holders of Major Bank Cards" *Wall Street Journal* (Eastern Edition), Marketing & Media, p. B.5 (Feb. 21, 1990).

"Secondary Mortgage Markets" *CompuVision* 5(4):28 (Winter 1988/1989). Abstract only.

Shoultz, D., "Lenders Speed Up Approval Procedure, Use Toll-Free Numbers For Convenience" *The American Banker*, Consumer Financial Services, p. 1 (Dec. 31, 1987).

Sichelman, L., "Dial-a-House (home buying)" *United States Banker* 99(10):116 (Oct. 1988). Abstract only.

Sichelman, L., "Mortgage Market is Changing" *Chicago Tribune* (North Sports Final, C Edition), Home Guide, p. 2 (Feb. 9, 1991).

Sichelman, L., "The Instant Mortgage" *United States Banker* (National Edition), Housing, p. 68 (Feb. 1988, National Edition).

Sing, B., "Pre-approved Loans Gain in Popularity/Mortgages OK'd Before Buyers Shop" *Houston Chronicle* (2 Star Edition), Business, p. 6 (Sep. 18, 1988).

Snyder, J., "Computers Give Lenders Edge Over Competitors More Mortgage Brokers are Taking Their Offices with Them on the Road" *Orlando Sentinel* (3 Star Edition), Central Florida Business, p. 14 (Sep. 20, 1993).

Stetenfeld, B. "Landing the Right Loan System: Loan Automation Buyer's Guide" *Credit Union Management* 14(7):28 (Jul. 1992).

Storts, W. et al., "Assignment for Survival: Reinvent the Bank" *The American Banker*, Comment, p. 4 (May 19, 1992).

Strauss, P., "Citicorp Strives for Nationwide Bank Net" *Data Communications* 12(9):74 (Sep. 1983). Abstract only.

Sullivan, D., "Consumer Banking: Branch Automation—Firstar Eases Lending with Standardized Documentation System" *American Banker*, p. 10.A (Apr. 26, 1993).

"Supermarket Branch Generates Loans" *ABA Banking Journal*, Update, p. 7 (Sep. 1992).

Talebzadeh, H. et al., "Countrywide Loan—Underwriting Expert System" *AI Magazine*, p. 51 (Spring 1995).

"Technology Topics: [1]" *American Banker*, 153(165):10 (Aug. 24, 1988).

Teixeira, D., "Technology: High Telephone Tech Gets More of a Voice in Issuers' Operations" *Credit Card Management* 1(3):20 (Jul. 1988). Abstract only.

"Teleprocessing Package Links All Credit Bureaus" *ABA Bankers Journal*, New Products and Services, p. 83 (Jul. 1982).

"TSYS Introduces a New Credit Card Processing System—TS2" *Business Wire* (Sep. 14, 1992).

Tyson, D., "Home Banking: Gateway Videotex Goes On-Line in California" *American Banker*, p. 8 (Oct. 9, 1984). Abstract only.

Tyson, D., "Interlinq Mortgage Software Hits Big Time with Prudential Real Estate Subsidiary Deal" *American Banker* (Nov. 18, 1987).

Van Sortima, D., "APS for Automated Credit Underwriting" *Credit Management*, p. 22 (Aug. 1991). Abstract only.

"Vendor Case Studies: Vysym" Credit Union Tech-Talk, http://www.cunews.com/casestudies/vysym.htm (2003).

"Videotex System Provides Instant Credit Checking" *Marketing News* 4(18):4 (Nov. 9, 1984). Abstract only.

Walker, C., "Chrysler First Entering Credit-Card Business" *The Morning Call* (Fifth Edition), Allentown, PA, Business, p. B.10 (Mar. 21, 1991).

Walters, D., "High-Tech Lobbying Clout Grows" *Newsday* (Nassau and Suffolk Edition), Business, p. 80 (Apr. 13, 1986).

"Weekend Money (Cashpoints): Cash by Phone" *The Guardian* (London), (Jan. 28, 1989).

Declaration of Scott Haertel Regarding HSBC's Wolf Furniture Credit Application System, dated Aug. 10, 2009.

\* cited by examiner

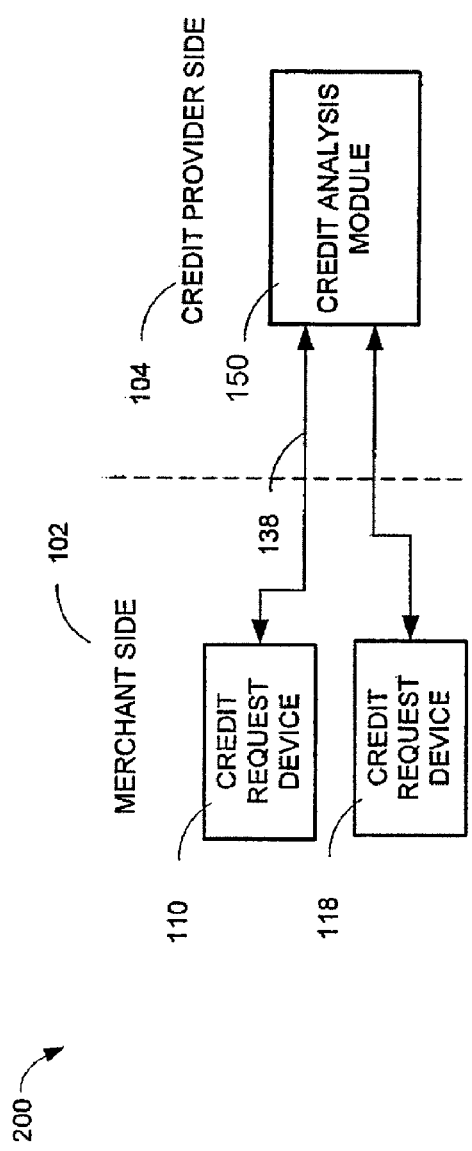
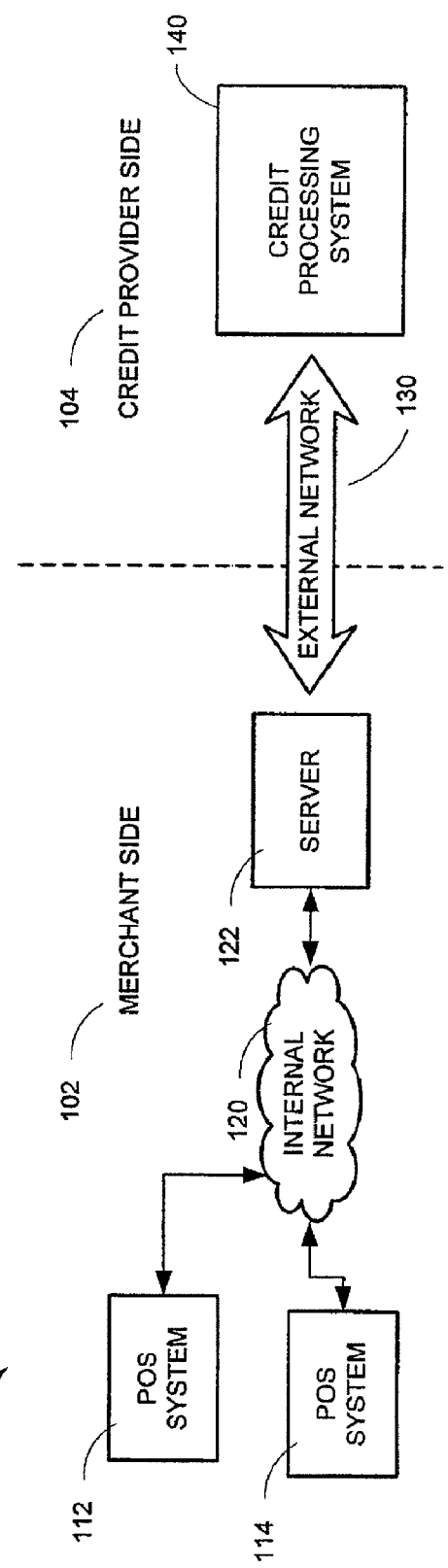

SYSTEM FOR AUTHORIZING CREDIT USE

CROSS REFERENCE TO RELATED APPLICATION

This application claims the benefit of U.S. Provisional Patent Application No. 60/759,988, filed Jan. 17, 2006.

BACKGROUND

The use of credit, particularly with credit cards, to purchase goods and services has become a necessary and an essential part of the modern economy. However, the process for obtaining credit is generally cumbersome and time-consuming. In most cases, a person or group ("an applicant") must apply for credit long before the credit is available to the applicant. An applicant may apply for a credit card electronically, by telephone, through the mail, or in person with one or more credit providers, and then wait for credit authorization. In some cases, an application for a credit card, such as a private label credit card, may be made within a store by a customer of the store. However, the customer may still wait days or weeks for the credit to be approved and for delivery of a credit card or other proof of credit to be mailed before the credit may be used.

From the credit provider's perspective, the traditional methods of obtaining a credit card, such as those discussed above, provide some advantages. For example, the traditional methods afford the credit provider a great deal of time to verify the information provided by an applicant on a credit application, determine the risks involved in approving the credit, approve the credit, and determine the terms under which the credit will be provided. The conditions may include a particular credit limit, interest rate, and payment schedule.

However, credit providers who use traditional methods for providing credit miss opportunities to provide credit. For example, the traditional methods for providing credit, including the in-store credit application, do not allow a credit provider to provide credit to customers shortly after the application has been completed and while they are still in a merchant's store. Because the traditional methods are time consuming and cumbersome, they lack the flexibility needed to provide in-store access to credit in a time frame that is sufficiently short to allow the customer to use the credit when the customer is ready to make a purchase. The traditional method for providing credit may cause merchants to miss opportunities as well. Without the ability to obtain virtually instantaneous credit, a customer may forego making purchases that would have been made if the customer could have accessed credit while in the merchant's store, thereby depriving the merchant of a timely sale.

SUMMARY

The present invention provides a system for approving a credit request. The system includes a credit request device located at a first location, and a point of sale system located at a second location. The credit request device is operable to receive a credit request and information relating to the credit request from a customer. The point of sale system is operable to receive customer-related information from either the customer or a merchant. The system also includes a credit analysis module and a first communication path that affords communication between the credit analysis module and the credit request device. The credit analysis module is operable to analyze information received from the credit device relating to the credit request to determine whether the credit request should be approved. The system also includes an activation module that is operable to establish a credit account including a line of credit for the customer, and an authorization module that is operable to authorize a purchase by the customer using the line of credit. A second communication path provides communication between the point of sale system and the credit analysis module, and between the point of sale system and the authorization module.

The present invention also provides a system for approving the use of credit for a purchase. The system includes a credit request device that is located at a first location, and a point of sale unit located at a second location. The credit request device includes an input device for receiving a credit request from a customer, and an output device for communicating information to the customer. The point of sale unit is operable to receive customer-related information. The credit approval system also includes a credit analysis module that operates to receive and analyze the credit request to determine whether the credit request should be approved. A first communication path provides communication between the credit request device and the credit analysis module, and a second communication path provides communication between the point of sale unit and the credit analysis module.

The present invention also provides a method for approving a credit request. The method includes receiving a credit request from a customer by way of a credit request device that is located at a first location. The credit request is communicated to a credit analysis module which analyzes the credit request to determine if the credit request should be approved. If the credit request is approved, the customer is presented with a conditional offer. The method also includes the manual verification of the identity of the customer at a second location.

BRIEF DESCRIPTION OF THE DRAWINGS

The components in the following figures are not necessarily to scale, emphasis instead being placed upon illustrating the general principles. Moreover, in the figures, the same reference symbols designate the same components with the same significance unless otherwise indicated.

FIG. 2 is a block diagram of a first communication path.

FIG. 3 is a block diagram of a second communication path.

DETAILED DESCRIPTION

Figure 1:
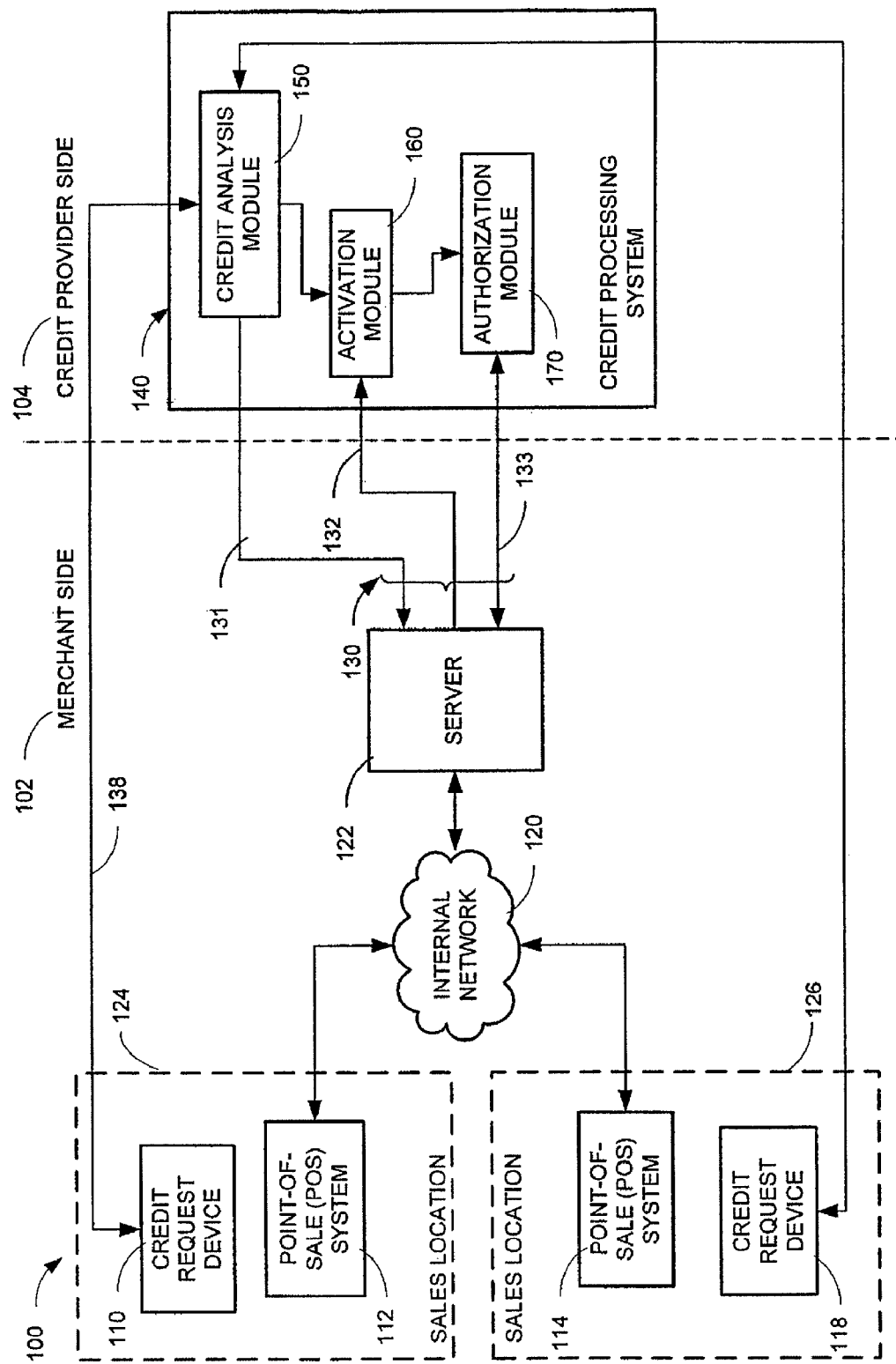
FIG. 1 is a block diagram of a credit authorization system.

With reference to the figures, a system for authorizing credit (the "system 100") is described. FIG. 1 shows an example of the system 100. The system 100 integrates access to the products and services offered by merchants and credit providers in a synergistic manner. This synergy allows a customer to take advantage of the offerings of merchants and credit providers in the same location and within a short period of time. The system 100 also makes it feasible for credit providers to provide credit within a very short time period, for example in minutes, by enabling the merchant to verify the customer's identity before the credit provider grants the customer access to the credit. Further, the system 100 makes it feasible for merchants to accept credit payment without tangible proof of credit, such as a credit card, by enabling the merchants to communicate directly with the credit providers to verify that a customer has access to credit before accepting the credit. Merchants include individuals and groups that sell goods and/or services, and those authorized to sell goods and/or services on behalf of such individuals or groups, such as employees and affiliates. Credit providers include individuals and groups that provide revolving and non-revolving loans ("credit"), and those authorized to provide credit on behalf of such individuals or groups, such as employees and affiliates. Customers include individuals and groups that have an interest in purchasing the goods and/or services offered by merchants and/or credit providers. Using the system 100, credit providers may offer and provide credit in the same physical location used by the merchants to sell goods and/or services, such as retail and wholesale stores, catalog stores, and warehouses. The physical location(s) used by the merchants to sell goods and/or services in which the system 100 is implemented are referred to as "sales location(s)."

An example of how a system for authorizing credit 100 may be used by a customer is presented in the following narrative. A customer visits a home and garden store and while in the store, he becomes enamored with the store's newest riding mower. Because the customer had not intended to purchase such an expensive item, he did not bring his credit cards, checkbook, or sufficient cash to buy the riding mower and he did not possess the store's credit card. Fortunately for the customer, the home and garden store had partnered with a bank to implement a system that allows customers to apply for, receive an offer for, and access to credit within a matter of minutes. Thus, using the system, it is possible for the customer to purchase the mower with credit and without ever leaving the store.

To apply for credit, the customer completes a credit application using a terminal located within the home and garden store, according to prompts provided by the terminal. The terminal communicates the customer's credit application to the bank's computer system for approval and generation of an offer for credit conditioned upon some type of verification of the customer's identity (a "conditional offer"). The approval and conditional offer are generally for a specific amount of funds (the "credit limit.") Because the approval process is automated, the customer's credit application may be evaluated within minutes. If the application is not approved, the terminal may communicate to the customer that an offer cannot be made, and may direct the customer to a customer service desk, other location or person for further instructions and/or information. If, however, the application is approved, the terminal may communicate a conditional offer to the customer and may instruct the customer to see one of the store's cashiers located at, for example, one of the store's cash registers. The terminal may also instruct the customer to inform the cashier that the customer wishes to make a purchase using the credit for which the customer just applied. Alternatively, the terminal may direct the customer to proceed to a cash register or customer service desk without notifying the customer as to whether a conditional offer has or will be made.

The customer may then select, gather, and/or identify items in the sales location that the customer is interested in buying, such as the riding mower. The customer may also select and gather other items, such as a shovel and plant seeds. The customer then proceeds to the cash register with the shovel and the plant seeds. Because the riding mower is too large to take to the cash register, the customer may take a document identifying the mower and the price of the mower so that the cashier may "ring up" the mover for delivery after the mower has been paid for.

When the customer arrives at the cash register to purchase the items, the customer informs the cashier that he or she would like to purchase the items with the credit for which the customer had applied using the terminal. Because the offer received by the customer is conditioned upon some verification of the customer's identity, the cashier may ask the customer to produce some identification, such as a driver's license. After the customer produces, for example, a driver's license, the cashier manually inspects the license to see that the license reflects the physical characteristics of the customer. The customer may be required to supply his or her Social Security Number or other information into a key pad or other input device in communication with the bank to provide identifying information and/or to accept the conditional offer. In this manner the customer's acceptance is communicated to the bank's computer system, which in response activates a credit account and authorizes the use of the credit to purchase the mower, shovel and seeds, assuming the purchase price for these items is equal to or below the approved credit limit. The bank's computer system then informs the cashier (through the cash register) that the credit has been authorized to purchase these items. Thus, the customer is able to immediately use the authorized credit to purchase the riding mower, shovel and plant seeds. In contrast, if the purchase price for the items is above the approved credit limit, the bank's computer system may inform the cashier (through the cash register) that the use of the credit to make the purchase is not authorized. In this case, the customer may not use the credit to purchase the mower, shovel, and plant seeds. The cashier may inform the customer that the customer has exceeded the credit limit and/or may direct the customer to a customer service desk, other location or person for further information and/or instructions.

An example of a system 100, such as that used by the customer in the preceding exemplary narrative, is shown in FIG. 1. As shown in FIG. 1, the system 100 includes two sales locations 124, 126, credit request devices 110, 118, and point-of-sales systems 112, 114. Further, the example of FIG. 1 includes a credit request device 110, 118 and a point of sale system 112, 114 in each sales location 124, 126, respectively. However, the system 100 may include any number of sales locations, credit request devices, and point-of-sales systems, with any number of credit request devices and point-of-sales systems included in a single sales location. In the description that follows, reference may be made to only one sales location, credit request device and point-of-sales system. Unless expressly indicated, such reference applies to both sales locations, credit request devices, and point-of sales systems.

As previously discussed, the system 100 enables a customer to apply for, accept an offer for, and gain access to credit offered by a credit provider in any of a merchant's sales locations 124, 126. The system 100 further enables the customer to use the credit provided by the credit provider in the sales location in which credit was provided to purchase goods and/or services offered by the merchant. The entire process may be performed in any of the sales locations 124, 126, and greatly reduces the time between applying for credit and the ability to use the credit in one of the sales locations 124, 126. Further, the system 100 allows a customer to use the credit without some sort of tangible proof of the credit, such as a credit card. The system 100 allows the merchants and credit providers to cross-sell their respective products in the same location, and take advantage of the natural connection between the products and services provided by each.

As shown in FIGS. 2 and 3, the system 100 is generally implemented in one or more locations used by the merchant (the "merchant side") 102, and one or more locations used by the credit provider (the "credit provider side") 104. On the merchant side 102, the system 100 collects information relating to the customer ("customer-related information"). On the credit provider side 104, the system 100 uses the customer-related information to determine whether to provide credit to the customer and the terms under which the credit will be provided. The credit request devices 110, 118 and the POS systems 112, 114 collect customer-related information that may include a request for credit ("credit request"), and information relating to the credit request, the customer's identity ("identification information"), and the customer's ability to pay for the credit used. The identification information may include the customer's age, name and Social Security Number. The POS systems 112, 114 may also enable manual collection of customer-related information in a manner that allows the merchant to verify the customer's identity.

On the credit provider side 104, the system 100 includes a credit processing system 140. The credit processing system 140 generally includes a module that uses the customer-related information to determine whether to approve a credit request and present a conditional offer, or deny a credit request (a "credit analysis module 150") in which case no offer may be presented. The credit processing system 140 may also include modules for creating a credit account (an "activation module 160"), and authorizing use of the credit (an "authorization module 170") to purchase items in the sales location 124, 126.

To facilitate the flow of information between the merchant side 102 and the credit provider side 104, the system 100 generally includes two communication paths as shown in FIGS. 2 and 3. The first communication path 200, shown in FIG. 2, facilitates communication between the credit request devices 110, 118 on the merchant side 102 and the credit analysis module 150 on the credit provider side 104. The credit request devices 110, 118 and the credit analysis module 150 may be in communication with each other using virtually any type of electromagnetic communication via a dedicated line or a network that provides a channel for electromagnetic propagation (the "credit channel 138"). The credit channel 138 may be isolated from other channels and/or networks, such as the Internet, to help preserve the integrity and security of the information communicated between the credit analysis module 150 and the credit request devices 110, 118.

As shown in FIG. 3, the second communication path 300 facilitates communication between the POS systems 112, 114 on the merchant side 102, and the credit processing system 140 on the credit provider side 104. If, as shown in FIG. 3, the system 100 includes multiple POS systems 112, 114 located in multiple sales locations 124, 126, respectively (see FIG. 1), the second communication path 300 may include a central node, such as a server 122, which communicates information between the merchant side 102 and the credit provider side 104 via an external channel or network 130. The server 122 may be located in one of the sales locations 124, 126 (see FIG. 1), or in a different location, such as the merchant's central office or headquarters. The POS systems 112, 114 may be in communication with the server 122 via an internal network 120. However, if the merchant side 102 includes only one sales location, the POS system 112 or 114 may be in communication with the external network 130, directly or indirectly, for communication with the credit processing system 140.

As shown in FIG. 1, the external network 130 may include three data flow channels 131, 132, 133 that provide communication between the POS systems 112, 114 and the credit analysis module 150, activation module 160, and authorization module 170 in the credit processing system 140. The first data flow path 131 communicates information relating to a credit request between the credit analysis module 150 and the POS systems 112, 114. The second data path 132 communicates customer-related information between the POS systems 112, 114 and the activation module 160. The third data path 133 communicates information relating to credit authorization between the authorization module 170 and the POS systems 112, 114. The internal network 120 and the external network 130 may provide a channel for electromagnetic propagation of virtually any type of electromagnetic communications.

On the merchant side 102, the credit request device 110 enables a customer to input a credit request, such as an application for a credit card, and communicates the credit request to the credit processing system 140 for approval or rejection via a credit channel 138. If the credit analysis module 150 needs additional information from the customer, the credit analysis module 150 may communicate a request for the additional information to the credit request device 110 via the credit channel 138. If the credit analysis module 150 is unable to process the credit request, the credit analysis module 150 may communicate a message to the credit request device 110 via the external network 138 indicating that the credit request cannot be processed. If the credit analysis module 150 is able to process the application, and approves the application, the credit request device 110 may present the customer with a conditional offer for credit and/or direct the customer to the POS system 112 located in the same sales location 124.

Figure 4:
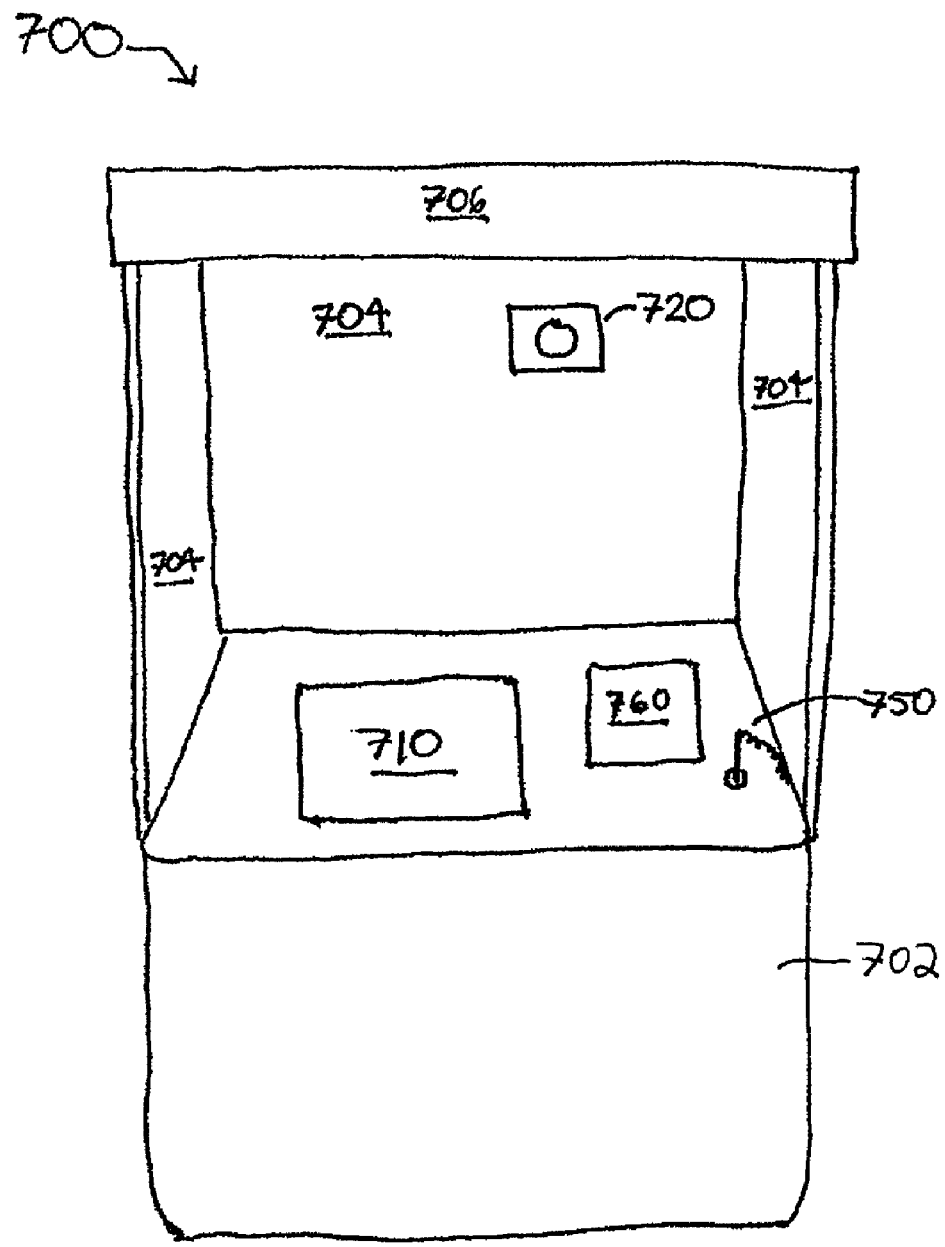
FIG. 4 is an isometric view of a credit request device implemented in a terminal.

The credit request device 110 may include a computer or terminal located in or in the vicinity of sales locations 124. An example of a credit request device implemented in a terminal 700 is shown in FIG. 4. The terminal 700 includes a housing 702 that supports the remaining components of the terminal 700. In addition, the terminal 700 may include one or more walls 704, and perhaps a top 706, to provide a customer with privacy while making a credit request. To provide additional security, the terminal 700 may include a security and/or identity monitoring device 720 to record images of the customer and others who may be in the vicinity of the terminal. The monitoring device 720 may include a camera or video recorder that captures images in digital or analog format. In addition, the terminal 700 may include one or more processors and one or more computer-readable memory devices (not shown) for capturing, storing and communicating the information entered by the customer. The memory devices may include any type of fixed or removable digital storage device and, if needed, a device for reading the digital storage device including floppy disks and floppy drives, CD-ROM disks and drives, optical disks and drives, hard-drives, RAM, ROM and other such devices for storing digital information. The processor may be any type of device or devices used to process digital information.

The terminal 700 may include one or more input and output devices, which together provide a user interface that enables the customer to communicate with the terminal 700. The user interface converts information received or captured from the customer into a format that may be communicated to the credit processing system 140 (shown in FIG. 1) over the credit channel 138 (shown in FIG. 2). The input device may be any type of visual, manual, mechanical, audio, electronic, or electromagnetic device capable of communicating information from a person to a processor, memory and/or network. Examples of input devices include card readers, scanners, keyboards, microphones, voice recognition systems, trackballs, and mice. The output device may be any type of visual, manual, audio, electronic or electromagnetic device capable of communicating information from a processor or memory to a person or another processor, memory, network, bus and/or another interface. Examples of output devices include monitors, speakers, liquid crystal displays, and ports or connectors for coupling to networks, buses, and other interfaces. Alternatively, the input and output devices may be included in a single device such as a monitor with touch screen capability (a "touch screen monitor"), computer, processor or memory coupled with the processor via a network.

For example, the terminal 700 of FIG. 4 includes a touch screen monitor 760 (and associated electronic pen 750), a magnetic bank card reader 740, and a magnetically encrypted card reader. The magnetic bank card reader 740 may obtain information from a bank card that may be used to identify the customer. In addition, the magnetic bank card reader 740 may also obtain information that may be used to identify the customer's bank and corresponding checking account. The touch screen monitor 760 may include a surface that converts the motion of an electronic pen 750, such as those made when a customer holds the pen and goes through the motions of making a signature into an electronic image of a signature. In addition to providing security, the monitoring device 720 may capture an image of the customer so that the image may be reproduced on a credit card.

In use, a customer may approach the terminal 700 and initiate a request for credit using the touch screen monitor 760. The customer may be prompted via the monitor 710 to provide identification information, such as by running a credit, debit, "smart", ATM or merchant card through the card reader 740, or by entering such information using the touch screen monitor 760 or other input device. The signature of the customer may be obtained using the touch screen monitor 760 and the electronic pen 750. The terminal 700 may additionally obtain the customer's permission to have an existing account, such as a deposit or checking account, automatically debited to repay any credit used, by obtaining the customer's signature on a consent form in a manner such as those discussed above. Applicable laws, regulatory requirements, and/or the credit provider own policies may be met by presenting the required information to the customer via the monitor 710 or pamphlets stored in or near the terminal 700. For example, the customer may be presented with a list of terms and/or conditions, such as Privacy Act information, the annual percentage rate (APR), and/or other such information related to the credit. An indication that the customer understands the information so presented may be obtained in the form of the customer's signature captured by the touch screen 760 using the electronic pen 750.

Figure 5:
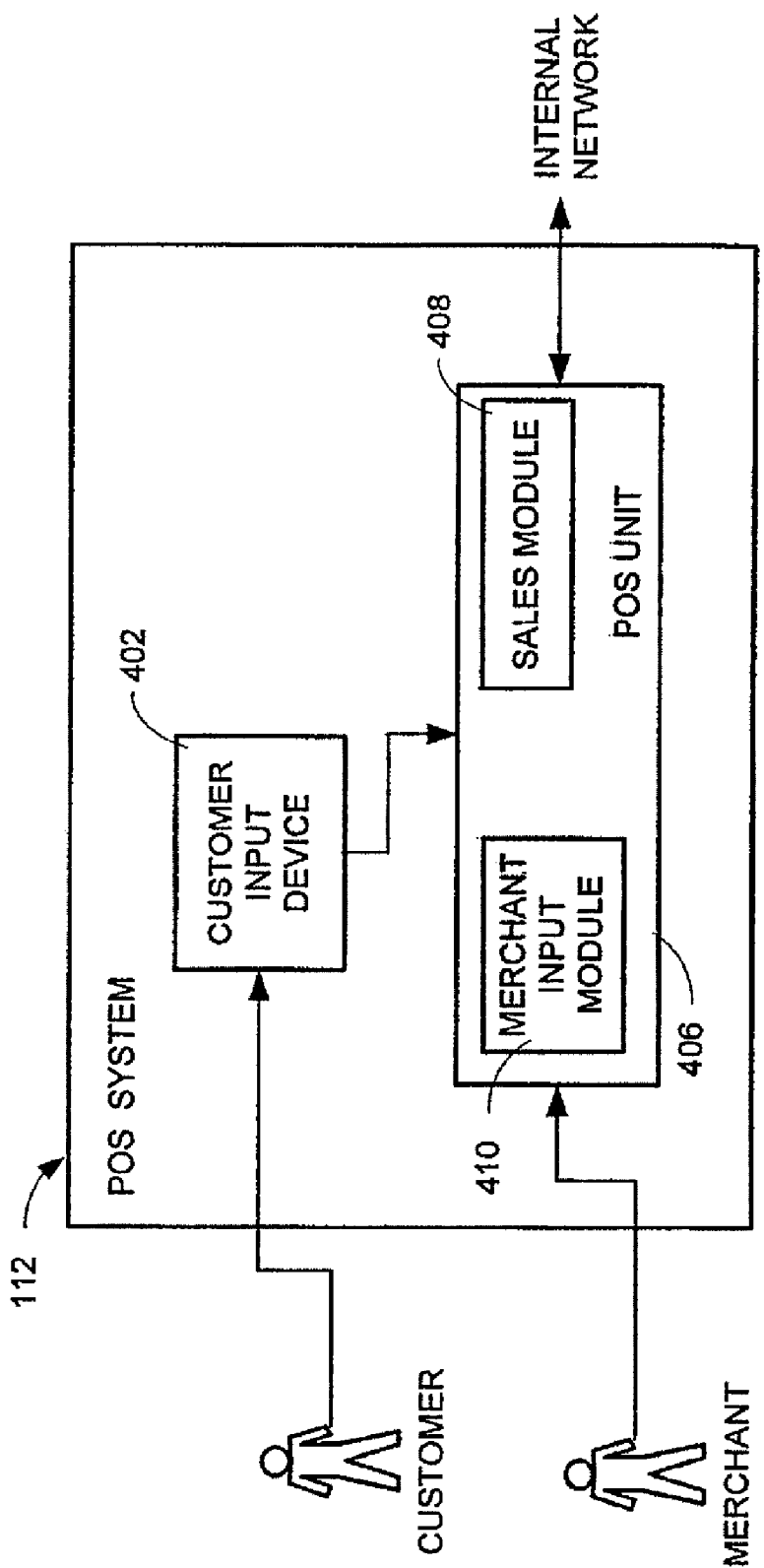
FIG. 5 is a block diagram of a point-of-sale (POS) system.

An example of a POS system 112 is shown in FIG. 5. The details of the POS system 112 of FIG. 5 may also apply to other POS systems (such as POS system 114). The POS system 112 may include a POS unit 406 and a customer input device 402. The POS unit 406 may include a sales module 408 that is used by the merchant to perform a sales transaction with the customer. In a sales transaction, the customer offers something of value (a "payment"), such as cash or credit to the merchant, in exchange for goods and/or services. The sales module 408 may include a cash register, credit card reader, bank card reader, and/or other device that may be used to transfer payment from the customer to the merchant.

The POS unit 406 may include a merchant input module 410 into which the merchant may enter customer identification information. The customer identification information may include the customer's driver's license number, Social Security Number, passport number, photograph, height, weight, and or date of birth. This information may be obtained from, for example, the customer's driver's license or passport. Thus, the merchant may request that such identification be produced by the customer to enable the merchant to inspect the identification and determine if, for example, the information provided by the customer's identification is consistent with the customer presenting it or the identification appears to be authentic. The merchant input module 410 may include an electronic cash register, or another type of visual, manual, mechanical, audio, electronic, or electromagnetic device capable of communicating information between a person and a processor or memory. Examples of merchant input modules 410 include card readers, scanners, keyboards, microphones, voice recognition systems, trackballs, mice, monitors, liquid crystal displays, touch screen monitors, and computers. The POS unit 408 may include memory and software containing computer-readable instructions for prompting the merchant to input customer identity information. The POS unit 408 may help insure that the merchant actually examines the customer's identification. For example, the POS unit 408 may prevent the merchant from continuing with a sales transaction until the merchant has entered customer identification information, such as the customer's date of birth, which may be obtained from the customer's driver's license, passport or other form of identification.

In addition, the POS system 112 may include a customer input device 402 into which the customer may enter identification information without disclosing this information to the merchant. The customer identification information entered into the customer input device 402 may be in addition to or instead of the identification information entered by the merchant into the merchant input module 406. The customer identification information may include information, such as the customer's birth date, Social Security Number, password or any combination of the foregoing. The customer input device 402 may include any type of visual, manual, mechanical, audio, electronic, or electromagnetic device capable of communicating information between a person and a processor or memory. Examples of customer input devices 402 include card readers, scanners, keyboards, microphones, voice recognition systems, trackballs, mice, monitors, speakers, liquid crystal displays, a touch screen monitor, and a computer. The customer input device 402 may communicate the information entered by the customer to the identification module 408 in the POS unit 406 over a wired or wireless electromagnetic communication channel. The POS unit 406 may communicate the customer identification information, collected through the customer input device 402 and/or the merchant input module 410, to the credit processing system 140 via the external network 130.

On the credit provider side 104 (referring to FIG. 1), the credit processing system 140 may include a credit analysis module 150, an activation module 160, and an authorization module 170. The credit analysis module 150, activation module 160, and authorization module 170 may include a memory device, a processor, and software or other digital instructions. These modules 150, 160, 170 may reside together, or in any combination on separate devices, such as a servers, memories or the like. The credit analysis module 150, activation module 160, and authorization module 170 may communicate with each other and the external network 130 using electromagnetic communications via an electromagnetic channel or network. These modules, separately or in any combination, may include one or more processors and one or more computer-readable memory devices (not shown). The memory devices may include any type of fixed or removable digital storage device and, if needed, a device for reading the digital storage device including, floppy disks and floppy drives, CD-ROM disks and drives, optical disks and drives, hard-drives, RAM, ROM, servers and other such devices for storing digital information. The credit analysis module 150, activation module 160, and authorization module 160 may include software programs, which utilize and/or manipulate the information communicated from the merchant side 102 and other sources. These software programs include computer instructions or software code that performs the required operations on the information received from the merchant side 102.

In general, the credit analysis module 150 analyzes a credit request to determine whether the request should be approved and a conditional offer presented. In addition, the credit analysis module 150 may determine terms under which the credit will be granted, such as the credit limit, payment period, interest rate, and late fees. To perform this analysis, the credit analysis module 150 may include a processor, use a processor shared with any of the other modules in the credit processing system 140, or the credit analysis module 150 may access a remote processor. The processor may access one or more remote databases, such as a credit bureau, to obtain a credit report and other information relating to the customer. Using the credit report and/or other information, the processor may perform a fraud analysis, verify the customer's signature, determine if the customer has written bad checks, and/or determine if the card presented by the customer for identification during the credit request is a stolen card. If there is any evidence of fraud, a block may be assigned to the customer's application and the customer may be directed to a customer service or other area. In this area, the customer may be provided with a phone number with which to contact someone on the credit order side 104 to resolve the matter. If the matter is resolved, the block may be removed from the customer's application and/or the customer may be directed back to the credit request device 110 to re-input all or a portion of the customer's credit request.

The credit analysis module 150 may evaluate the information obtained from the customer via the credit request device 118, the credit report, and other information to determine whether or not to approve the credit request, the credit limit, and the conditions for approval, using information, such as information received from one or more credit bureaus, and the credit provider's own internal criteria.

The decision made by the credit analysis module 150 regarding whether the credit request was approved is communicated to the credit request device 110 via credit channel 138 (see also FIG. 2). The credit request device 110 may present the customer with a conditional offer for credit if the credit request was approved, or inform the customer that an offer cannot be made. Further, the credit request device may provide the customer with further instructions based on whether the credit analysis module 150 has approved the credit request. The further instructions may direct the customer to a location in which the merchant may verify the customer's identity and enable the customer to accept the conditional offer for credit. For example, if the credit analysis module 150 approved the credit request and presented the customer with a conditional offer for credit, the credit request device 110 may direct the customer to a POS system 112. In contrast, if the credit analysis module 150 has informed the customer that an offer cannot be made, the credit request device 110 may direct the customer to a different location, such as a customer service desk (not shown).

Alternately, if the credit request device 110 did not inform the customer as to whether an offer has been made, the credit analysis module 150 may communicate its decision regarding whether to approve the credit request, and, if appropriate, the conditions for acceptance to the POS system 112 via the external network 130. This enables the merchant to notify the customer (who was directed to the POS system 112 by the credit request device 110) of the acceptance or rejection of the credit request. If the credit request was approved, the merchant may promptly inform the customer that a conditional offer for credit has been made and the terms for use of the credit, while the customer is still in the sales location 124. In addition, whether the customer was notified that a conditional offer was made by the credit request device 110 or by the merchant, the POS system 112 may enable the customer's identification to be manually verified, and the customer to accept the conditional offer by collecting the customer's identification information and communicating this information to the activation module 160.

In addition to receiving the customer's identification information from the POS system 112, the activation module 160 may receive the decision to approve or deny a credit request and, if appropriate, the conditions for acceptance and use of the credit from the credit analysis module 150. If the credit request was approved by the credit analysis module 150, a conditional offer was presented to the customer and the proper identification information was communicated from the POS system 112, the activation module 160 will create an account for managing the approved and accepted credit (a "credit account"). The activation module 160 may then communicate information relating to the newly-established credit account, such as the customer's (account holder's) name, address, and credit limit, to the authorization module 170.

If a customer wishes to use the credit to purchase goods and/or services while in the sales location 126, the POS system 114 communicates the total price of the goods and/or services to the authorization module 170. The authorization module 170 determines whether to authorize the customer to use the approved credit to purchase the goods and/or services. The authorization module 170 may authorize the customer to use the credit to make a purchase if the total purchase price of the goods and/or services does not exceed the customer's credit limit. Whether the authorization module 170 authorizes the use of the credit, the authorization module 170 may communicate the authorization or rejection to the merchant via the POS system 112 while the customer is still in the sales location 124. If the purchase is authorized, the customer may use the credit to make a purchase from the merchant in the sales location 124.

Figure 6:
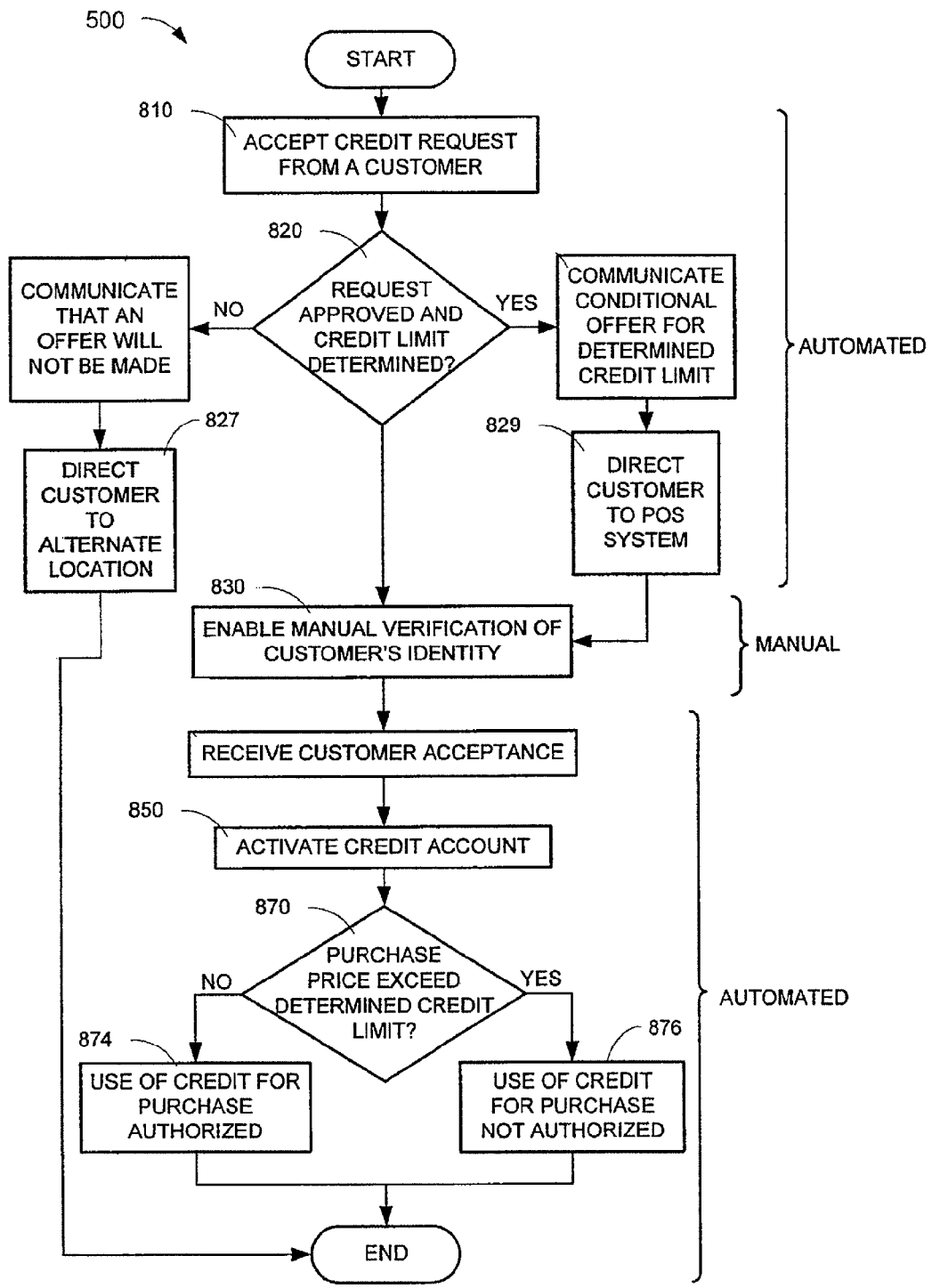
FIG. 6 is a flow chart of a method for authorizing credit at a sales location.

A generalized example of a method for authorizing credit at a sales location (the "method 500"), in which a credit request device, such as 110, presents a conditional offer to the customer, or informs the customer that an offer cannot be made, may be practiced using the system 100 (FIG. 1), is shown in FIG. 6 with reference made to FIGS. 1, 4 and 5. The method 500 includes a combination of automated and manual steps, which allows a customer to apply for, gain approval of, and obtain authorization to use credit in a relatively short period of time (for example, minutes), in the same location. The combination of automated and manual steps also allows the merchant and credit provider to take advantage of the synergistic relationship between their products and services with the added assurance of a manual verification of the customer's identity information.

The method 500 includes accepting a credit request from a customer in step 810. This step is generally performed automatically by a credit request device 110 in a sales location 112. The credit request is automatically communicated to a credit analysis module 150 for approval or rejection in step 820. If the credit request is not approved, the credit request device 110 may communicate to the customer that an offer cannot be made and may direct the customer to a location, such as a customer service desk in step 827. In contrast, if the credit request is approved, the credit request device 110 may present the customer with a conditional offer for credit with a specified credit limit in step 820. The credit request device 110 may also direct the customer to the POS system 112 in step 829, which enables the merchant to manually verify the customer's identity in step 830. The POS system 112 may also enable the merchant to enter customer identification information into the POS system 112 (not shown) to help ensure that the merchant actually manually checks the customer's identification. For example, the POS system 112 may prevent the merchant from continuing with a sales transaction until information, such as the customer's date of birth, has been entered. If the customer's identity can be verified in step 830, the condition for the credit offer may be satisfied. Thus, the customer may communicate an acceptance of the conditional offer by entering customer information, such as the customer's Social Security Number into a customer input device 402. After the customer accepts the conditional offer, a credit account will be activated by the activation module 160 in step 850. In order for the customer to use the credit to make a purchase, the total price of the purchase cannot exceed the customer's credit limit, which is determined in step 870. If the purchase price exceeds the credit limit, use of the credit to purchase items may not be authorized 876. However, if the total purchase price of the items is below or equal to the credit limit, the use of the credit to purchase the item may be approved 874 and the credit may be authorized for use by the customer while the customer is still in the sales location 124. The customer may be notified by the merchant that the customer has been granted access to the credit in step 870. The customer may now use the credit to purchase goods and/or services from the merchant without the need to present proof of credit, such as a credit card.

Figure 7:
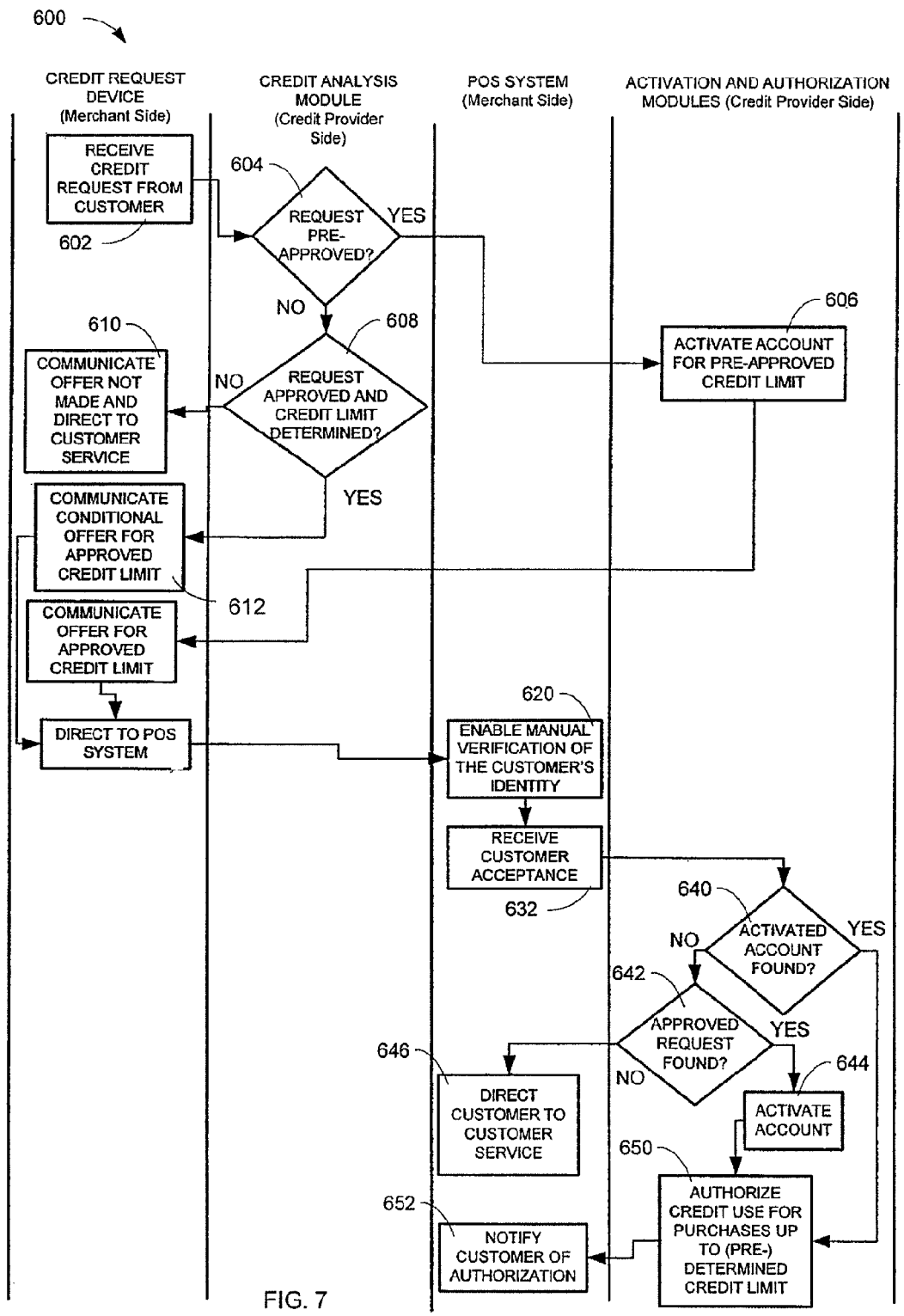
FIG. 7 is a swim-lane representation of another method for authorizing credit at a sales location.

An example of a method in which the system 100 (FIG. 1) may handle pre-approved credit is shown in FIG. 7 with reference made to FIG. 1. Pre-approved credit is credit offered to a select group of customers based on criteria such as the customers' income level, credit rating, place of residence and bank balances ("pre-approved customers"). Pre-approved customers generally receive notice of their pre-approved status via mail, email or telephone from the merchant and/or credit provider. The notification may include a code, such as an alpha-numeric string of characters, which the pre-approved customer may use to identify their pre-approved status. Because pre-approved customers are approved for a credit limit before they enter a sales location 124, pre-approved customers need only go to the sales location 124, make a credit request, and indicate their pre-approved status via a credit request device 110 to obtain access to the credit. The pre-approved customers may identify their status by entering identification information into a credit request device 110. For example, the identification information may be predetermined and supplied by the merchant and/or the credit provider, such as a code. Once the customer has been identified as pre-approved, the credit processing module 140 need only activate a credit account and authorize the pre-approved customer's access to the credit.

FIG. 7, with reference to FIG. 1, is a swim-lane representation in which the steps contained in a vertical column are performed by the component of the system 100 indicated at the top of the column. The process 600 is initiated when the credit request device 110 receives a credit request from a customer in step 602, in any of the manners described herein. The credit request device communicates the credit request to the credit analysis module 150, which determines if the customer is a pre-approved customer (in other words, whether the request has been pre-approved) in step 604 from the code or other information provided by the customer. If the credit analysis module 150 determines that the credit request has been pre-approved in step 604, the credit analysis module 150 will communicate the approval to the activation module 160 and the credit request device 110. The activation module 106 will automatically open a credit account with a pre-approved credit limit in step 606, and the credit request device 110 may present a conditional offer to the pre-approved customer and direct the pre-approved customer to the POS system in step 612.

In contrast, if the credit analysis module 150 determines that the customer has not been pre-approved in step 604, the credit analysis module 150 determines whether the credit request should be approved and a credit limit determined, or rejected in step 608. After the credit analysis module 150 has made a determination regarding the approval of the credit request in step 608, the credit analysis module 150 will communicate this determination to the credit request device 110. The credit request device 110 will provide instructions to the customer based on whether the credit request has been approved or rejected. If the credit request has been rejected, the credit request device 110 may notify the customer that an offer cannot be made and instruct the customer to proceed to a customer service desk or other location in step 610. At such a location, the customer may be informed of and provided with reasons for the rejection, and may be given the opportunity to clarify any issues that had a negative impact on the credit request. For example, the customer may be provided, for example, with a phone number or e-mail address which the customer may use to contact the credit provider and attempt to resolve any issues that prevent the customer from being approved for credit.

If, however, the credit request has been approved, the customer may be presented with a conditional offer for credit including an approved credit limit, and may be instructed to proceed to a POS system in step 612. At the POS system 112, the merchant is provided the opportunity to manually verify the identity of the customer (pre-approved or not) in step 620. For example, the merchant may examine the customer's driver license, passport or other acceptable form of identification to see if the customer appears to fit the description provided by the identification. This verification may satisfy the condition attached to the credit offer made to the customer. Thus, the customer may indicate acceptance of the conditional offer by entering information such as the customer's Social Security Number, birth date, or mother's maiden name into a customer input device 402 (see FIG. 5) in step 632.

After the customer has indicated acceptance of the conditional offer, the POS system 112 communicates the customer's acceptance to the activation module 160. The activation module 160 determines whether an activated account already exists for the customer in step 640. The existence of an activated account for the customer generally signifies that the customer was pre-approved, and an account had already been activated for the customer in step 606. However, if no activated account exists, the activation module 160 may determine whether an approved credit request exists for the customer 642. If no approved credit request exists for the customer, this fact is communicated to the merchant via the POS system, and the merchant may instruct the customer to proceed to a customer service or other location in step 646. If, however, an approved credit request exists for the customer, the activation module 160 may activate a credit account for the customer in step 644. After either an activated account is found for a pre-approved customer in step 640, or an account is activated for a non-pre-approved customer in step 644, the authorization module 170 may authorize the customer to use the credit up to the approved credit limit in the sales location in step 650. The authorization module 170 may communicate this information to the POS system 112, so that the customer may be notified of the authorization in step 652 by the merchant, the POS system 112 and/or indicated on a receipt. Assuming the customer does not exceed the approved credit limit, the customer may use the credit to purchase goods and/or services from the merchant without waiting for a card, or even leaving the sales location.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A system for approving a credit request and authorizing a purchase request, the system comprising:
   a credit request device operable to receive customer-related information from a customer, the credit request device located at a first location, and the customer-related information including a credit request;
   a point of sale system operable to receive customer identification information and to process the purchase request, the point of sale system located at a second location;
   a credit analysis module operable to analyze the customer-related information to determine whether the credit request should be approved, and to generate a conditional offer of credit upon approval of the credit request;
   a first communication path between the credit request device and the credit analysis module for communication of the customer-related information and the conditional offer of credit;
   an activation module in communication with the credit analysis module for receipt of information relating to the conditional offer of credit, the activation module operable to establish a credit account in response to confirmation that the customer has accepted the conditional offer of credit, the credit account including a line of credit;
   an authorization module operable to authorize or disallow use of the line of credit for the purchase request; and
   a second communication path isolated from the first communication path and affording communication between the point of sale system and the activation module, and between the point of sale system and the authorization module,
   wherein in response to receiving the conditional offer of credit from the credit analysis module, the credit request device directs the customer to the point of sale system for initiation of the purchase request and merchant verification of an identity of the customer, wherein the point of sale system obtains the customer identification information when the customer initiates the purchase request, and sends the customer identification information to the activation module via the second communication path, thereby indicating to the activation module that the customer has accepted the conditional offer of credit, and wherein upon receipt of the customer identification information and while the customer is at the point of sale system, the activation module establishes the credit account including the line of credit and the authorization module authorizes or disallows the requested purchase.

2. The system of claim 1, wherein the credit request device includes an output device, and wherein the conditional offer is communicated to the customer by way of the output device.

3. The system of claim 1, wherein the credit analysis module communicates at least some of the customer-related information to the activation module, and wherein the activation module compares the customer identification information received via the second communication path to the at least some of the customer-related information received from the credit analysis module.

4. The system of claim 1, wherein the second communication path includes a communication network having a first data flow channel, a second data flow channel, and a third data flow channel, wherein the first data flow channel communicates the conditional offer between the point of sale system and the credit analysis module, wherein the second data flow channel communicates the customer identification information between the point of sale system and the activation module, and wherein the third data flow channel communicates information relating to the line of credit and the purchase between the point of sale system and the authorization module.

5. The system of claim 1, wherein the credit analysis module communicates conditions for acceptance of the conditional offer to the activation module, and wherein the activation module communicates a credit limit to the authorization module.

6. The system of claim 1, wherein the first and second locations are located within a merchant store, and wherein the credit request device is a terminal located within the merchant store, and the point of sale system is a cash register located within the merchant store.

7. The system of claim 1, wherein if the credit request is denied by the credit analysis module, the credit request device directs the customer to a service area located at a third location.

8. A system for approving the use of credit for a purchase, the system comprising:
   a credit request device, the credit request device including an input device for receiving customer-related information including a credit request from a customer, the credit request device also including an output device for communicating information to the customer, the credit request device located at a first location;
   a credit analysis module operable to receive and analyze the customer-related information to determine whether the credit request should be approved, and to generate a conditional offer of credit upon approval of the credit request;
   a first communication path providing communication between the credit request device and the credit analysis module, the first communication path carrying the customer-related information from the credit request device to the credit analysis module, and carrying the conditional offer of credit from the credit analysis module to the credit request device;
   a point of sale unit operable to receive a purchase request and customer identification information associated with the purchase request, the point of sale unit located at a second location;
   an activation module operable to establish a credit account for the customer, the credit account including a line of credit, the activation module in communication with the credit analysis module;
   an authorization module operable to authorize or disallow use of the line of credit for the purchase request; and a second communication path isolated from the first communication path and providing communication between the point of sale unit and the activation module and between the point of sale unit and the authorization module, wherein in response to receiving the conditional offer and before the credit account is established, the credit request device by way of the output device directs the customer to the point of sale unit for initiation of the purchase request, including manual verification of an identity of the customer by the merchant and inputting of the customer identification information into the point of sale unit, wherein the activation module receives at least some of the customer-related information from the credit analysis module, receives at least some of the customer identification information via the second communication path, compares the at least some of the customer-related information to the at least some of the customer identification information and, upon finding a match, establishes the credit account including the line of credit for the customer, and, while the customer is at the point of sale unit, the authorization module authorizes or disallows the purchase request.

9. The system of claim 8, wherein if the credit analysis module requires additional information to determine whether the credit request should be approved, the credit analysis module communicates a request for additional information to the credit request device, and the credit request device by way of the output device communicates the request for additional information to the customer.

10. The system of claim 8, wherein if the credit analysis module is unable to approve the credit request, the credit analysis module communicates the inability to approve the credit request to the credit request device, and wherein the credit request device by way of the output device provides instructions directing the customer to a customer service area located at a third location.

11. The system of claim 8, wherein the credit request device is a terminal and the input device includes at least one of a touch screen monitor and a magnetic card reader.

12. The system of claim 1, wherein the first communication path provides communication between the credit request device and the credit analysis module via a dedicated line or network.

13. The system of claim 8, wherein the first communication path provides communication between the credit request device and the credit analysis module via a dedicated line or network.

14. The system of claim 5, wherein after the point of sale system sends the customer identification information to the activation module via the second communication path to indicate that the customer has accepted the conditional offer, the activation module creates an account number and communicates the account number and the credit limit to the authorization module.

15. The system of claim 8, wherein when the activation module establishes the credit account, the activation module creates an account number for the credit account.

\* \* \* \* \*